Sept. 3, 1974   W. A. MILLER ET AL   3,833,708
IMMISCIBLE POLYMER PRODUCTS AND PROCESSES
Original Filed June 9, 1969

INVENTORS
Walter A. Miller
William P. Mulvaney
BY George A. Skoler
ATTORNEY

United States Patent Office 3,833,708
Patented Sept. 3, 1974

3,833,708
IMMISCIBLE POLYMER PRODUCTS
AND PROCESSES
Walter A. Miller and William P. Mulvaney, Somerville, N.J., assignors to Union Carbide Corporation, New York, N.Y.
Continuation-in-part of abandoned application Ser. No. 831,659, June 9, 1969. This application Aug. 4, 1972, Ser. No. 278,076
Int. Cl. B29c 25/00
U.S. Cl. 264—344   7 Claims

ABSTRACT OF THE DISCLOSURE

The invention relates to making shaped articles of immiscible polymers using as one of the polymers, a copolymer of ethylene and acrylic and/or methacrylic acid which can be readily solubilized to allow its rapid extraction with water. These may also be added in an extraction aid, such as glycerine, in making the shaped article.

Figure 1:
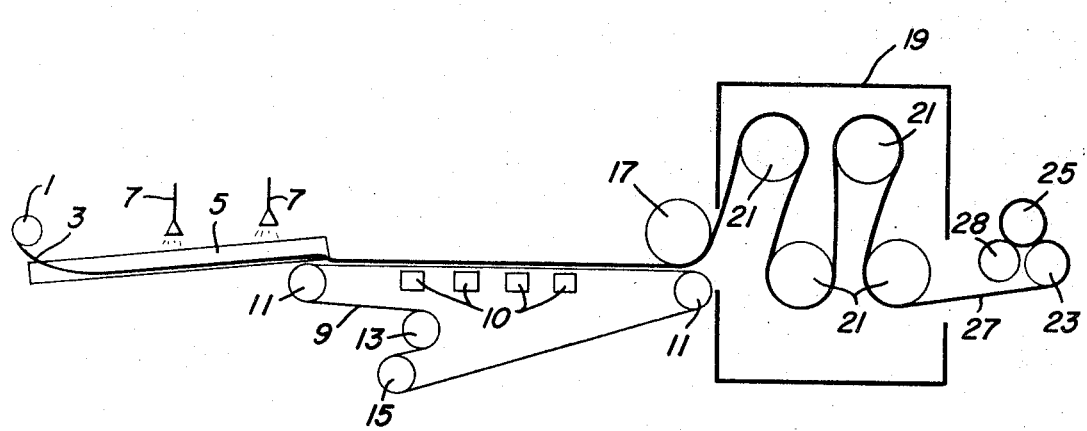

The water extracted product can be a tow or web of ultra-fine fibers.

---

This application is a continuation-in-part of copending application Ser. No. 831,659, filed June 9, 1969, now abandoned.

This invention relates to the manufacture of fibrous and sheet structures containing at least two immiscible fibers therein and wherein one of said fibers comprises a copolymer of ethylene and acrylic and/or methacrylic acid and which can be rendered water dispersible or soluble when the carboxy moiety of the copolymer is converted into a salt.

The manufacture of fiber and sheet-like structures by the extrusion of blended immiscible polymers is described in a number of U.S. patents, for example, Nos. 3,382,305; 3,099,067; 3,234,313; and 3,097,991.

These patents describe that extremely fine fibrils can be obtained from the melt extrusion of a blend of immiscible polymers and dissolving out one of the fibrous polymers from the extruded shaped article to produce a fibrillated structure made of ultra-fine fibers having cross-sectional diameters typically not greater than 5 microns. As significant as are these teachings, it has been determined as a result of many experimental efforts that extraction of one of the fibrils from the structure is not easily effected simply because organic solvents do not quickly attack all of the fiber structures whereby to extract essentially all of such fibrous polymer therein. To achieve satisfactory extraction it is required to use long periods of extraction and this makes handling of the resulting extracted structure most difficult, frequently causing damage to it. In addition the organic solvents are relatively expensive and their use can result in substantial loss thereof because of the need to distill the solvent off to allow recovery of the extracted polymer.

There is described herein a method which allows the manufacture of melt extruded shaped articles of an immiscible polymer mixture from which one can readily obtain fibrils of a water insoluble polymer by extraction of the shaped structure with water to remove a water dispersible or soluble polymer therein. An added feature of this process is that the polymer extracted from the shaped structure can be readily recovered without costly distillation by simply precipitating the polymer from solution with water, followed by drying thereof.

This invention encompasses the formation of a melt extrudable immiscible polymer mixture of any one or more water insoluble fiber-forming polymers with a copolymer of ethylene and acrylic and/or methacrylic acid or water dispersible salts thereof. The aforementioned copolymer is characterized by being rendered water soluble or dispersable when it is converted to a water-soluble salt. Such copolymers and the salts thereof are well-known. These known copolymers which when dissolved or dispersed in basic aqueous solution are known to be capable of being precipitated therefrom by changing the pH of the bath from an alkaline state to an acidic state. This can be accomplished by adding enough acid to the bath to provide a neutral to acid solution. Preferably the amount of acid added is sufficient to render the solution or dispersion acidic. The precipitated copolymer can then be washed of salts and dried at a moderate temperature for subsequent re-use.

Another facet of this invention involves the addition of the aforementioned ethylene-acrylic and/or methacrylic acid copolymer and an extraction aid to the other fiber-forming polymer to form the immiscible polymer mixture and the resulting immiscible polymer shaped structure achieved by melt extrusion. This extraction aid is a material of relatively low molecular weight typically having a molecular weight below about 2500, preferably below 1000. It is further characterized by having at least a hydroscopicity equal to that of the ethylene-acrylic acid and/or methacrylic acid copolymer. Preferably, the extraction aid is incompatible in the melt with the other polymer(s) present in the immiscible polymer mixture. It may be added in combination with the aforementioned copolymer or it may be added to the immiscible polymer mixture without prior mixing with the copolymer.

The ethylene-acrylic and/or methacrylic acid copolymers employed in the practice of this invention are described in U.S. Pat. No. 3,264,272, patented Aug. 2, 1966, and U.S. Pat. No. 3,321,819, patented May 30, 1967. Though these patents are directed to the salt form of the copolymers, it is to be understood that in the practice of this invention the free acid copolymers and the salt form thereof may be employed. In the practice of this invention, the polymerized acrylic and/or methacrylic acid content of the copolymer is at least about 14 to not more than about 55 weight percent, based on the weight of the copolymer. The remaining weight of the copolymer is, of course, polymerized ethylene. Most desirably, the copolymers do not have a melt index greater than about 300 and not less than about 0.1, as expressed in decigrams per minute.

For the purpose of describing the invention, emphasis has been made of a copolymer of three potential ingredients, to wit, ethylene, acrylic acid and methacrylic acid. However for the purposes of scope, this invention is not limited to just this class of copolymers. Broadly speaking, the copolymer can be expressed as a polymer of an alpha-olefin having the general formula $RCH=CH_2$ wherein R is a radical selected from the group consisting of hydrogen, alkyl radicals having from 1 to 8 carbon atoms and phenyl. The acrylic acid and/or methacrylic acid can be substituted in part or completely by other alpha,beta-ethylenically unsaturated carboxylic acids, preferably having from 3 to 10 carbon atoms therein. In addition to the two acids mentioned previously herein, there is included, by way of example, ethacrylic acid, itaconic acid, maleic acid, fumaric acid, 9-decenoic acid, and the like. The copolymer may be made originally from the respective anhydrides of the above acids or from the acid itself. It is to be emphasized, that for the purposes of this invention the use of acrylic and/or methacrylic acid is highly preferable but by no means is this invention restricted by this selection. Thus any of the alpha,beta-ethylenically unsaturated carboxyl acids as defined above, which term includes acrylic and methacrylic acids, can be advantageously employed. As mentioned previously, the copolymer can be at least partially saponified before use. The degree of saponification, when saponified, should be at least sufficient to cause the polymer to be soluble in water. The above limits on the amount of saponification are not intended to be so restrictive because in the operative practice of this invention the amount of saponification is determined as that amount which allows dissolution in water at 100° C. of at least about 25% weight percent of the copolymer.

The aforementioned ethylene-acrylic and/or methacrylic acid copolymer, particularly partial salts thereof, that is only a portion of the carboxy groups are neutralized by salt formation, may be dry blended or melt blended with the other polymer components by the method described in the aforementioned patents relating to extrusion of blended immiscible polyers, to wit, U.S. Pats. Nos. 3,382,305; 3,099,067; and 3,097,991. In blending the copolymers and the other polymer constituents to make an immiscible polymer blend one may also include as a component in such blending operation the extraction aid described above.

Useful polymers which may be employed in the manufacture of shaped articles containing immiscible and distinct ultrafine fibers therein include any of the polymers which are melt extrudable, fiber-forming, incompatible in molten mixture with the ethylene-acrylic and/or methacrylic acid copolymer, which upon extrusion may be molecularly oriented and which will not react, under the conditions of blending and extrusion, with the ethylene-acrylic and/or methacrylic acid copolymer, the alkaline salts thereof, or with the extraction aid. The last condition is not a critical one but when optimum properties are desired that property in the polymer is preferred.

In general practice of this invention there may be employed amounts of the extractable ethylene-acrylic and/or methacrylic acid copolymer, other immiscible polymer(s) and the extraction aid in the general ranges of from about 20 to about 75 weight percent of the ethyleneacrylic and/ or methacrylic acid copolymer; 20 to 70 weight percent of the other immiscible polymer(s); and from 0 to about 20 weight percent of the extraction aid; each weight percent is based upon the total weight of the immiscible blend of such components. Preferably, there is employed at least about 30 weight percent to about 60 weight percent of the ethylene-acrylic and/or methacrylic acid copolymer, at least about 30 to about 60 weight percent of the other immiscible polymer(s) and from at least about 5 to about 15 weight percent of the extraction aid.

The extraction aid is a hygroscopic organic compound which may be soluble in the ethylene-acrylic and/or methacrylic acid copolymer but is clearly insoluble in the other polymer components employed in the blend which is to be extruded. Moreover, in the preferred practice of this invention, it has a boiling point which is greater than the temperature obtained on extrusion of the immiscible polymer blend into shaped articles. If the compounds have these properties then they are suitable as an extraction aid in the process of this invention, to wit, substantial hygroscopicity, relatively low molecular weight typically below 2500, to some degree miscibility with the ethylene-acrylic and/or methacrylic acid copolymer and a boiling point which exceeds the temperature at which the immiscible polymer mixture is extruded or withdrawn from the orifice or slot in the extruder. Illustrative of organic compounds suitable for use as such extraction aids include alcohols, ethers, sulfoxides, amides, carboxylic acids, phosphonic acids, phosphonates, phosphates, sulfates, sulfonates, amines, quaternary ammonium, quaternary phosphonium, amine oxides, and compounds containing a combination of the above radicals as moieties thereof. Particularly preferred are the alcohols and ethers, because of their high hygroscopicity, temperature stability and compatibility with the ethylene-acrylic and/or methacrylic acid copolymers.

Of the alcohols, there are included organic mono-ols and polyols. Generally, it is preferred that the mono-ols also contain ether radicals therein such as characterized by methyl ether of ethylene glycol, ethyl ether of ethylene glycol, and the like. Also preferred mono-ols are the polyalkylene oxide alcohols containing 1 hydroxyl group, such as the monoalkyl ethers of polyalkyleneoxides, e.g., monoethyl ether of polyethylene glycol, monoethyl ether of polypropylene glycol, monobutyl ether of block or random copolymers of ethylene oxide and propylene oxide, monomethyl ether of polytetramethylene oxide, and the like. Rather than the ethers, one may employ the mono esters such as formed by the reaction of one mole of a mono or polycarboxylic acid with one mole of an alkylene ether glycol; provided the molecular weight of such ester reaction product does not exceed about 2500.

The polyols, that is, organic polyhydroxy alcohols, can be alkane di-, tri-, and tetra-ols such as ethylene glycol, 1,2-propylene glycol, 1,3-propylene glycol, glycerine, as well as partial esters thereof such as a fatty acid glyceride diol. Also encompassed as very suitable polyols are the polyalkylene ether polyols such as polyethylene oxide diol, poly-1,2-propylene ether glycols, poly-1,4-tetramethylene ether diols, copolymer diols formed from ethylene oxide and 1,2-propylene oxide, the polypropylene oxide triol adducts of 1,2,6-hexanetriol, and the like.

As pointed out above, the aforementioned extraction aids can be pre-blended in the ethylene-acrylic and/or methacrylic acid copolymer or if sufficiently soluble in such copolymers, it may be absorbed therein. Alternatively, it may be incorporated initially with the other polymers used in forming the immiscible polymer blend or it may be separately incorporated simultaneously with the components which form the immiscible polymer blend. The procedures described above for formation of such blends as set forth in the aforementioned patents can be employed to incorporate the extraction aid without the need for any special techniques.

As mentioned previously, the ethylene-acrylic and/or methacrylic acid copolymer may be utilized as such or in its salt form. Such salt forms are achieved with alkali metals, ammonia, and/or amines. Such salts are described in the aforementioned U.S. Pats. Nos. 3,264,272 and 3,321,819, and render the copolymers water-soluble. The degree of salt formation employable in the copolymer in forming the immiscible polymer blend is typically limited to less than total salt formation, that is, less than all of the carboxyl groups of the copolymer are neutralized by salt formation. Usually less than 75 percent of such carboxyl groups are so converted to salt, yet however, it is more desirable to employ copolymers wherein at least about 20 percent of the carboxyl groups have been neutralized by salt formation. The purpose for this is that by rendering at least a portion of the copolymer water-soluble, it is possible to enhance the rate at which dissolution of such copolymer is effected once the blend has been extruded into a shaped article and the shaped article is subjected to leaching with water.

The extraction aid is another factor in enhancing the dissolution of the ethylene-acrylic and/or methacrylic acid copolymer fibers from the shaped article. In the preferred practice of this invention there is provided in the polymer blend forming the shaped article an ethylene-acrylic acid and/or methacrylic acid copolymer which is partially neutralized and the extraction aid. It is the combination of these two which yield the optimum rate of dissolution of the copolymer from the shaped article.

The other essential constituent in making the immiscible polymer blend other than the ethylene-acrylic and/or methacrylic acid copolymer and the extraction aid, is one or more thermoformable polymers which are immiscible with the ethylene-acrylic and/or methacrylic acid copolymer when they are mixed in the melt state. In addition, when the extraction aid is employed, it is most desirable that such polymers be not more than 10 percent by weight soluble in the extraction aid, preferably, not more than 2.5 percent by weight soluble in the extraction aid and more preferably, essentially insoluble in the extraction aid. In the practice of this invention, the selection of the immiscible polymer or polymers is dependent upon the type of fibers which are desired to have remaining once the ethylene-acrylic and/or methacrylic acid copolymer is extracted from the shaped article containing such polymer. Such polymers can be a soft or hard polymer or may have properties intermediate of such classification.

These polymers when blended with the aforementioned extractable ethylene-acrylic acid copolymer, with or without the extraction aid, and melt extruded into the form of a shaped article, such as a filament (which filament can be converted to staple fiber by cutting or chopping), a rod, a ribbon, or a unidirectionally oriented film or tape, upon removal of the ethylene copolymer and the extraction aid, there are obtained ultra-fine fibers each possessing the dimensional characteristics of fibers, to wit, an essentially cylindrical, elongated shape which can be employed as a tow, or for making extremely thin fiber sheets.

The other polymers employable, other than the water-soluble ethylene-acrylic acid copolymers are classified as non-extractable polymers in that when the blend is formed into a shaped article and the shaped article is treated with water to remove the extractable ethylene-acrylic acid copolymer, there is left behind ultra-fine fibers of such polymers. Hence, herein and in the claims, reference shall be made to "non-extractable or residual ultra-fine fiber(s)" and "extractable ultra-fine fibers." An "extractable ultra-fine fiber" shall mean an ultra-fine fiber in the shaped article which is removed therefrom by methods of extraction and if the method of extraction involves the use of water as the extractant, the fibers are called "water extractable ultra-fine fiber(s)" and it is intended by such language to mean fibers from the aforementioned copolymers of ethylene-acrylic and/or methacrylic acid. Such extractable ultra-fine fibers shall mean those fibers which are removed from the shaped structure and non-extractable or residual ultra-fine fibers shall mean those fibers which are left behind in solid form after removal of the extractable ultra-fine fibers.

It is also intended by these definitions to indicate that this invention encompasses not only water extraction but also in conjunction with such water extraction the added step of organic solvent extraction such that one may take the aforementioned shaped article containing at least two different immiscible polymer fibers in addition to the water-extractable ethylene-acrylic acid copolymer fibers, and extract first the water-soluble ethylene-acrylic acid copolymer fibers followed by solvent extraction of one of the remaining immiscible polymer fibers using an inorganic solvent therefor which solvent is not a solvent for the residual ultra-fine fibers.

A further limitation to this invention is the selection of an immiscible polymer, or an appropriate extraction aid, such that blending and/or extrusion will not result in the formation of degradation products. Thus, for example, if the immiscible polymer is a polyester such as a polyethyleneterephthalate, then the extraction aid should not be an alcohol such as a glycol and glycerine, and the salt moiety of the ethylene copolymer should preferably be from an amine, e.g., a secondary or tertiary amine, e.g., diethylamine or bis(ethanol)amine. In the case of such a polyester, a desirable extraction aid is diethoxytetraglycol, $C_2H_5O(C_2H_4O)_4C_2H_5$.

An advantage of this invention arises from the rapid opening of the shaped structure using water as a solvent for the copolymer of ethylene-acrylic and/or methacrylic acid and the extraction aid therein. This initial extraction step opens up the interior of the shaped article such that more rapid dissolution of other water-insoluble polymer fibers therein may be effected by choice selection of organic solvent to selectively dissolve out certain residual fibers left after the water extraction step thereby to have remaining residual fibers intended to be present after both extraction steps. Though this feature is not regarded to be any more advantageous than singular extraction of the ethylene-acrylic acid copolymer with water, it is to be understood that it is not intended in the practice of this invention that selective solvation as indicated above varies from the invention characterized.

In characterizing the invention hereafter, reference is made to certain definitions of characterization of the polymers intended to be the residual fiber component after the water extraction step. In defining such fibers reference will be made to tensile modulus. That term as employed herein and in the claims is the 1 percent tensile modulus of the polymer employed in the manufacture of the particular ultra-fine fiber in question determined in accordance with ATSM D-638.

Those ultra-fine fibers which have a tensile modulus below about twenty-five thousand (25,000) are herein called "soft ultra-fine fibers." Ultra-fine fibers which possess a higher tensile modulus are herein called "hard ultra-fine fibers."

There are two types of soft polymer fibers employable in practice of this invention, to wit, elastomeric soft ultra-fine fibers and non-elastomeric soft ultra-fine fibers. The elastomeric soft ultra-fine fibers are characterized as being made up of a polymer having a tensile modulus below about ten thousand (10,000) determined at 25° C., which tensile modulus is preferably above 100, most preferably above 250. It is desirable that it have a tensile strength of at least fifty (50) p.s.i. (pounds per square inch), preferably at least 200 p.s.i. and most preferably at least 600 p.s.i. The elastomeric ultra-fine fiber, in isolated condition, is capable of at least 100 perecnt extension (i.e., stretch), effected at any temperature, and at least about 50 perecnt recovery within ten minutes when relaxed at room temperature (25° C.). In addition, the elastomeric ultra-fine fiber is capable of at least 25 percent elongation at room temperature. The elastomeric polymeric polymer which is employed in making the ultra-fine fiber is thermoformable, that is, a polymer which can be shaped to an extremely fine diameter fiber, such as below 5 microns in diameter under pressure and heat.

Particularly illustrative of a thermoformable polymer is a thermoplastic polymer, but the definition of thermoformable is not restricted thereto. A polymer which is not wholly thermoplastic because it contains some cross-linking but is capable of being shaped into the ultra-fine fiber is encompassed by the term thermoformable.

The non-elastomeric, soft ultra-fine fiber is also made of a polymer which is thermoformable. It has a tensile modulus of less than about twenty-five thousand (25,000). Its tensile modulus is generally above five thousand (5,000). As an ultra-fine soft fiber it does not possess the rubbery quality of the elastomeric, soft ultra-fine fiber as is shown by the fact that it does not recover when relaxed after 100 percent extension within 10 minutes at room temperature. Though this fiber is soft, it is typically considered somewhat harder and stiffer than the limp elastomeric ultra-fine fiber.

The hard ultra-fine fiber, as employed herein and in the claims, is made from a thermoformable polymer which has a tensile modulus in excess of about twenty-five thousand (25,000), preferably in excess of about fifty thousand (50,000). Its other properties including non-rubbery quality is the same as described above for the soft non-elastomeric ultra-fine fiber.

Included in the definition of raw materials are other inert ingredients which are not critical to the manufacture of porous sheet-like structure. Such materials include, by way of example, fillers, pigments, dyes, plasticizers, and the like. They are called herein "inert ingredients."

Illustrative of non-elastomeric soft polymers which form the soft non-elastomeric ultra-fine fibers are the following: low density polyethylene, polyvinylacetate, essentially water-insoluble partially hydrolyzed polyvinylacetate, non-elastomeric copolymers of ethylene and alkylacrylates such as ethylacrylate, n-butyl acrylate and 2- ethylhexyl acrylate and the like, maleic acid anhydride adducts of pyrolyzed polyethylene, polypropylene, copolymers of ethylene and propylene, polyepsilon-caprolactone, wholly aliphatic polyester and polycarbonate resins, and the like.

Illustrative of elastomeric polymers which produce the soft elastomeric ultra-fine fibers include for example, elastomeric polyurethanes, polyamides, polyesters, polycarbonates, polyalkylacrylates, copolymers of ethylene and ethylacrylate which can be partially saponified with caustic and the like but which are water-insoluble.

Suitable polyurethane elastomers are the segmented polymers of soft, low-temperature melting hydroxyl-terminated polymers which have been bonded through urethane linkages to stiff, high-temperature melting urethane, polyamide, polyurea, and/or polyester polymers which have been terminated with iso-cyanato or groups reactable with polyisocyanates (such as hydroxyl, amino, mercapto, and the like).

The more desirable polyurethanes typically possess at least one, preferably at least two, recurring polyether radical, that is, a polymeric moiety possessing recurring ether linkages i.e., —C—O—C— wherein the carbon atoms adjacent the oxygen are saturated, in the internal chain structure thereof, and/or at least one, preferably at least two, recurring polyester radical, that is, a polymeric moiety possessing recurring ester linkages, i.e.,

in the internal chain structure thereof. The polyether and polyester radicals preferably possess a molecular weight of at least about 500 and not in excess of about 7,000. They are joined to the remainder of the polymer by urethanyl linkages, i.e.,

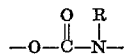

wherein R may be hydrogen or an organic group such as alkyl of from 1 to about 8 carbon atoms, cycloalkyl of from 5 to 8 carbon atoms, phenyl, or benzyl. The urethanyl linkage is bonded to a carbon atom of the organic residue of an organic diisocyanate which in turn is joined through the nitrogen atom of an amide linkage

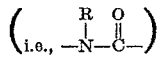

to one of the active hydrogen-free (as determined by the well-known Zerewitinoff method) residue of, e.g., an organic diol, a polyamine compound or amino to form a urea linkage

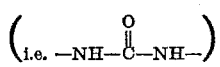

The polyether and polyester radicals as described herein and in the claims may also contain urethanyl linkages of the type described above in the chain thereof. Such radicals desirably have a melting point below 150° C., and preferably below 60° C.

The polyester radical may be formed by the reaction of a dicarboxylic acid with an organic diol or by the condensation polymerization of an alpha-omega-hydroxycarboxylic acid or an alpha-omega-lactone. Preferably, these polyesters are hydroxyl end-blocked in that the end groups of the polyester are hydroxyl bonded to non-carbonyl containing carbon atoms. These polyesters are then reacted, if they are of the desired molecular weight, with an organic diisocyanate, most desirably in the ratio of at least 2 moles of diisocyanate to one mole of the polyester, to form a diisocyanato end-block prepolymer. This prepolymer is then reacted with a chain extender such as diol or dithiol chain extenders, diamino chain extenders, or water, to form a substantially linear, solvent-soluble polyurethane. A process for the manufacture of the aforementioned polyurethanes is described in U.S. Pat. 3,097,192. Specific illustrations of chain extenders include hydrazine, ethylene diamine, 1,3-propylene diamine, 1,4-butane diamine, 1,6-hexamethylene diamine, 1,4-piperazine, ethylene glycol, 1,2-propylene glycol, 1,4-butane diol, ethanol amine, diethanolamine, urea, dimethylol urea, and the like.

Other suitable polyesters may be formed by the reaction of epsilon caprolactone and/or alkyl-substituted epsilon caprolactone and an active hydrogen containing initiator such as water, ethylene glycol, ethylene diamine, diethylene glycol, dipropylene glycol, or 1,2-propylene glycol, such as described in U.S. Pats., Nos. 3,169,945; 3,186,971; and 3,427,346.

The polyesters possessing hydroxyl end groups and having a molecular weight in excess of 500 and up to 7,000 may then be reacted with an organic diisocyanate to produce a polyurethane prepolymer having a molecular weight of from about 1,000 up to about 10,000. This polyurethane may be isocyanato end-blocked for direct reaction with the chain extender or may be hydroxyl end-blocked and is considered a prepolymer for additional reaction with diisocyanate, as described in U.S. Pat. No. 3,186,971.

Another polyurethane which is more suitably employed is that described in U.S. Pat. No. 2,871,218. The polyester-polyurethane of this patent is made by admixing a hydroxyl end-blocked or terminated polyester, formed by the reaction of 1,4-butane diol with adipic acid, with diphenylmethane-p,p'-diisocyanate and 1,4-butane diol in essentially exact stoichiometric proportions. The polyester should have a molecular weight of about 800 to 1,200 and for every mole of polyester there is employed from about 1.1 to 3.1 moles of the diisocyanate and from about 0.1 to 2.1 moles of the butane diol. By increasing the mole amount of diisocyanate, it is possible to increase the melting point and hardness of the resulting polyurethane and by reducing the mole amount of diisocyanate, it is possible to decrease the melting point and hardness of the resulting polyurethane.

The polyethers may be characterized in essentially the same manner as the polyesters above. They fall in the same melting point ranges, are desirably in the same molecular weight range and are hydroxyl end-blocked or terminated. They are formed by the alkaline or acid condensation of alkylene oxides. Such polyethers and their utilization in polyurethanes are described in U.S. Pats. Nos. 2,813,776, 2,818,404; 2,929,800; 2,929,803; 2,929,804; 2,048,707; 3,180,853 and Re. 24,691.

Suitable polycarbonate elastomers include the segmented polymers of soft, low-temperature multihydroxyl-terminated polymers which have been bonded through carbonate linkages to stiff, high-temperature multicarbonate polymers.

Such polycarbonate elastomers are illustrated in the following patents:

Canadian Pat. No. 668,153 issued Aug. 6, 1963, note particularly Examples 2 and 3; U.S. Pat. No. 3,030,335, patented Apr. 17, 1962, note Example 2 and the disclosure at column 1, lines 56 to 68, inclusive; U.S. Pat. No. 3,161,615, patented Dec. 15, 1964, noted particularly Examples 3, 7, 10, 14, 15, 19, 20, 21, 22, 24 and 25; U.S. Pat. No. 3,207,814, patented Sept. 21, 1965, note Examples 1, 2, 5, 7, 9, 10 and 11; and U.S. Pat. No. 3,287,442, patented Nov. 22, 1966, note Examples 9, 10, 11, 13, 16, 18, 21, 23 29 and 30. The method and the components involved in the manufacture of such polycarbonate elastomers suitable for use in the practice of this invention are disclosed in the above patents and the disclosures of these patents are incorporated herein by reference with respect to their teachings of methods and reactants.

Suitable elastomeric polyesters are described in U.S. Pat. No. 2,623,031, patented Dec. 23, 1962, note Examples 1, 2, 3, 4, 5 and 6; U.S. Pat. 3,023,192, patented Feb. 27, 1962, note all of the examples therein; and U.S. Pat. No. 3,037,960, patented June 5, 1962, note all of the examples therein. These elastomeric polyesters are also segmented copolymers in which a soft segment is interbonded to a hard segment by an ester linkage. The hard segment is polyester and the soft segment may be polyester or polyether such as described above with respect to polyurethane elastomers.

Suitable elastomeric polyalkyl acrylates include, by way of example, poly(ethylacrylate), copolymers of ethylacrylate and other alkylacrylates such as n-butylacrylate, 2-ethylhexyl-acrylate, and the like. Also included are copolymers of ethylene with alkylacrylates (such as ethylacrylate) which can be saponified with caustic such as sodium and/or potassium hydroxide, to produce useable terepolymers of ethylene, alkylacrylate and acrylic acid. Other copolymers of this class include copolymers of ethylene with acrylic acid and/or other alkylacrylates such as 2-ethylhexyl-acrylate, and the like.

Suitable elastomeric polyamides for use in this invention are described in U.S. Pats. Nos. 2,929,801; 3,044,987 and 3,044,989.

The hard ultra-fine fibers are obtained from thermoformable polymers, as characterized above, such as high density polyethylene, polypropylene, poly-1-butene, polystyrene, poly-alpha-methylstyrene, poly-alpha-chlorostyrene, copolymers of vinyl chloride and vinyl acetate, partially hydrolyzed copolymers of vinyl chloride and vinyl acetate, copolymers of vinyl methyl ketone and vinyl chloride, polymethylmethacrylate, polymethacrolein, diethylacetal of polyacrolein, copolymers of styrene and acrylonitrile, nylon (such as polyhexamethyleneadipate polytetramethylene sebacamide, poly - epsiloncaprolactam, polypyrrolidone), the polyimidazolines, polyesters (such as polyethyleneterephthalate, poly-1,4-cyclohexyleneterephthalate, and the like), oxymethylene homopolymers and copolymers (the formaldehyde polymers), polycarbonates such as the reaction product of phosgene or monomeric carbonate esters with bis Phenol A [2-bis(4-hydroxy-phenyl)propane], and the like, polyarylene polyethers such as described in U.S. Pat. No. 3,624,536, patented Aug. 2, 1966, and the like.

The process for producing the shaped article comprising the ultra-fine fibers involves blending two or more thermoformable, melt-immiscible polymers plus the water-extractable ethylene-acrylic acid copolymer and optionally the extraction aid, melt extrusion of the blend into the shape of a mono-filament, multi-filaments, rod, ribbon or film with drawing of the shaped article either during extrusion or thereafter. As stated previously, the shaped article contains at least one water extractable and one non-extractable fiber therein. These fibers are derived from the extrusion and drawing of a blend of polymers which are immiscible in each other, that is they are mutually incompatible in each other either in solid or molten state. Usually, both polymers have molecular weights greater than 10,000. Generally speaking, in combining mutually incompatible polymers prior to extruding them into the shaped article, conventional methods and apparatus are entirely suitable. If the polymers are available as raw materials in powder, pelletized or granular form of sizes substantially uniform and equal as between the two or more polymers, dry blending, e.g. in a conical blender or a ribbon blender, is quite good. However, if the particle sizes of the individual polymers are too dissimilar, poor mixing results from these methods. In this event, hot processing methods may be employed. Fluxing the polymers on a two-roll mill or a Banbury mixer at a temperature dependent on the polymers being handled produces suitable mixtures.

Another means of mixing is to dissolve all of the starting materials in a suitable mutual solvent system and then removing the solvent(s) by evaporation. Still another method, practical when polymers are being used which show little tendency to degrade at temperatures near their melting point, is the so-called "double" or "single" extrusion in which the polymers are fluxed by a normal melt extrusion operation, pelletized or chopped after being extruded and dry mixed before the final extrusion into the shaped article.

Particle and pellet size of the incompatible polymers in a dry blended mixture affects the dimension of the fibers ultimately obtained only when very little working of the mixture in molten state is done prior to extrusion through an orifice or slot to form a shaped article such a mono-filament, multi-filament, rod, ribbon or film. If for example, a mixture of two incompatible polymers is charged into a heated cylinder equipped with a piston to force the molten mixture out through a small orifice with a minimum amount of milling of the mass, the dimensions of fibers comprising the extruded filament can be controlled by correlating the particle size in the dry blend mixture with the dimension of the fibers produced, having set a fixed rate of filament attenuation (drawing or stretch). If there is no milling prior to or during extrusion, a proportional relationship exists between fiber diameter and pre-extrusion particle size.

Normal operation, however, produces ultra-fine fibers such as described above. By normal operation is meant that at some point in the extrusion process the incompatible polymers are fluxed in a plastic state to such an extent that initial particle size of the starting materials is not a factor in determining the dimensions of the fiber in the article. The amount of fluxing required is not great—the operation of the feeding screw in a conventional screwed type extruder being sufficient. Hot processing of a granulated polymer mixture on a two-roll mill or Banbury mixer before extrusion is sufficient even if a nonmilling type ram or plunger extruder is used.

Extrusion conditions, particularly temperature, will vary over a relatively wide range. The conditions depend on the physical and chemical properties of the extruded polymers and thus may even vary for identical compositions according to the preference of the skilled operator. However, the fluxed mixture of the incompatible polymers must obtain a melt fluidity in the extruder such that during the first drawn stage there is a smooth reduction of the diameter as the composite mono-filament, multi-filament, multi-filaments or film issues from the orifices or slot and elongates while being hot drawn. While the extruded mix, as it issues from the extruder nozzle, does have a fibrous nature, attenuation (or drawing) ensures production of ultra-fine fibers. Such drawing can be achieved in the extruder provided the extruder is machined for this purpose.

It is to be understood that whereas either hot drawing or cold drawing alone may produce fine fibers in a composite shaped article of this invention of the two or more mutually incompatible polymers, each such operation produces unique characteristics in the final ultra-fine fiber produced and such result may be achieved by employing both techniques in combination. Hot drawing will, in the main, serve to reduce the diameter in thickness of the extruded article thereby necessarily reducing the diameter of the individual fibers of which it is composed. After hot drawn in the melt, the fibers in the article have little or no molecular orientation in the longitudinal direction.

The amount of hot processing or fluxing of the two or more mutually incompatible granulated polymers will be a factor in determining the diameter of the ultra-fine fibers making up the composite article at the moment it emerges from the extruder die. The difference in diameter between the bore of the extruder and the die orifice or slot causes a certain amount of attenuation which may vary between extruders or for the same extruder depending on the size die that is attached. However, once the fluxing and extruding conditions for a given polymer mixture has been adapted, a single determination of the fiber size produced for a given amount of hot drawing is sufficient to establish approximately the amount draw to produce fibers of a desired diameter. Assuming ideal characteristics for the individual ultra-fine fibers in the shaped article, that is, they are uniform rods, preferably having circular cross-sectional areas, and elongate the same extent as the shaped article is elongated, the diameter of a fiber after drawing is equal to the diameter before drawing divided by the square root of the ratio of the new length to the old length.

If desired, cold drawing to induce molecular orientation may be included as an integral part of the overall process and follow immediately after hot drawing or may be carried out at any time, even after storage of the shaped article.

Cold drawing is primarily for the purpose of inducing the ultra-fine fibers' molecular orinetation in a longitudinal direction. This "stretch orientation," as it is commonly called, is well known in the synthetic fiber art to effect improvement in physical properties such as tensile strength and, in some instances, resistance to a heat aging. The stretching of the shaped article is carried out in the same fashion as it is effected in the prior art. The degree of orientation imparted to the fiber is dependent upon the polymer employed and the uses to which the product will be put. Due to the relationship of the diameter to the length of ultra-fine fiber before and after stretching, cold drawing sufficient to induce orientation to the extent of several hundred percent stretch or elongation does not greatly alter the ultra-fine fiber's diameter even when hot drawing had previously reduced it to a range of for example 0.125 microns.

It is preferred in the practice of this invention that the molten immiscible polymer mixture be drawn at least 100 percent either during extrusion or after extrusion to obtain a shaped article most favorably employable in the practice of this invention. This drawing is exhibited or evidenced by a commensurate reduction in the diameter or thickness of the shaped article from the corresponding diameter or thickness of the immiscible polymer mixture from which it is obtained just before its extrusion. Such drawing can be achieved in the extrusion opening or by pulling the article at a great rate as it issues from the opening.

As stated previously, the shaped extruded article described above contains therein a plurality of extremely fine (ultra-fine) fibers. The extruded shaped article, regardless of whether it is a mono-filament, multi-filament, film etc., contains many such ultra-fine fibers therein, for example, a rod having a one-inch square cross-section can contain one million or more of such fibers laying parallel to the drawing axis of the rod.

The aforementioned shaped articles containing ultra-fine fibers provide an excellent source of fibers having an extremely small average cross-sectional diameter, in all cases below 0.5 denier, usually below about 5 microns in average cross-sectional diameter, determined normal to the elongated length of each such ultra-fine fiber. In most cases, the average cross-sectional diameter is typically greater than 0.05 microns and the average cross-sectional diameter ranges from between about 0.1 micron to about 3 microns. Fibers of such average cross-sectional diameter provide, when spread out on a flat surface, substantial hiding power, that is, an extremely small weight of such fibers can provide a uniquely high degree of opacity. Regardless of the tensile strength determined by standard procedures of the polymers making up the fibers, the individual fibers, because of their extremely small diameter, do not possess great strength. When such fibers are formed into a sheet whereby the fibers are grouped together either physically or chemically and each is in a position to lend its individual strength to the mass of fibers in which it is associated the mass possesses extremely high tensile strength, oftentimes, superior to an oriented polymer fiber of the same mass but in single filament form. It has been taught in the art that such ultra-fine fibers can be used as a tow and employed in weaving and knitting of fabrics. The aforementioned process provides the best method known for making such tows economically and with facility.

There is also described herein a method for making non-woven sheets which may have characteristics of textile fabrics possessing physical strengths, on a comparative weight basis, which exceed those of conventional non-woven and woven fabrics yet can also be made to possess the opacity, the appearance and the tactility of such woven, non-woven and knitted fabrics. There is described herein a method for producing sheets of non-woven fabric comprising ultra-fine fibers in essentially continuous length and thereby provide a structure of unique qualities.

There is also described herein extremely thin gossamer sheets of continuous length ultra-fine fibers which may be unidirectionally aligned in the length direction of the sheet or randomly aligned. Such gossamer webs are extremely thin having average thicknesses typically not more than about 100 microns, and ranging from, in the usual case, about 1 micron up to about 50 microns in average thickness. Such gossamer web sheets can be used, as such, as base layers for the growth of human tissues thereon. Particularly because of their opacity, porosity and thinness, such webs represent an advance in the art in the manufacture of artificial body units, because they can be used as layer upon which can be formed body tissues in the normal body repair. For example, such ultar-fine fiber web sheets can be placed in the body as a support layer upon which the body can grow tissue. Thus, they have exceptionally good utility in the repair of vessels, organs, membranes, arteries, and the like, in the interior of the body.

The ultra-fine fiber web sheets of this invention are characterized by essentially complete removal of the extractable fiber from the shaped article and thus provides a sheet which contains essentially no occluded fiber bundles therein. This means that such sheets are essentially free of bundles of ultar-fine fibers which have not been opened and which if present, could reduce the sheet's opacity, as well as adversely affect the uniformity of its appearance. The ultra-fine fiber web sheets are characterized by having essentially uniform density across their surface dimensions. Such uniform products are impossible to obtain by prior art processes of organic solvent extraction of a sheet of immiscible polymer fibers because the length of extraction for essentially complete removal of the extractable fibers causes collapse and entanglement of the ultra-fine fibers thereby producing a sheet of inconsistent thickness and width.

In the above description reference has been made to essentially unidirectional alignment of the ultra-fine fibers in the sheet. By this, it is meant, that the gross effect of the alignment of the ultra-fine fiber is in a single direction though it is recognized that many of the ultra-fine fibers do exist in the sheet in a direction lateral to its length direction. Moreover, the individual ultra-fine fibers do not extend in the sheet for its full length. The ultra-fine fibers can be of various lengths ranging from about one half inch to many feet long, but the continuous length characteristic referred to above is noticed because each ultra-fine fiber does not terminate in a marked way but rather is fixed to another fiber whereby to achieve a continuous web like structure. Thus the sheet is characterized as a mass of ultra-fine fibers interlocked with each other to form a gossamer-like web having extremely high tensile strength when pulled in the length direction yet readily separated when pulled in the width direction. Such webs are also characterized by having an essentially uniform thickness across its full width. That is, the thickness at its edge is essentially the same as the thickness of its middle. Such characteristic is distinguishable from an ultra-fine fiber tow spread out in the form of a sheet. With respect to such tow sheet, its thickness is not uniform simply because fibers lay on top of fibers and bundle together to provide in the usual case a substantially greater thickness at the center and lesser thickness at the edges.

Such gossamer webs have utility as noted above in and of themselves. They may also be employed by laying one on top of the other to produce thicker sheets having improved properties of strength and opacity and which when interbonded provide fabrics which may be used for apparel, bed sheeting, pillow cases, carpet backing, upholstery material, drapery material, shoe innerliner material, reinforcing material, backing materials for plastics and rubber, and for essentially any use to which woven, knitted and non-woven fabrics of conventional structure are put.

Such sheet like materials are readily formed by treating a tape, sheet, ribbon, filament, and the like with water, preferably water which has been rendered alkaline, that is, has a pH greater than seven, preferably greater than eight. The water treatment can be effected by spraying the shaped article of immiscible polymers, as characterized above, with water or immersing the shaped article into a body of water or passing the shaped article through a moving stream of water. However, this is done, it is in the practice of this invention that the ethyleneacrylic and/or methacrylic acid copolymer be completely neutralized before extraction is completed. Thus, the water treatment may or may not contain alkaline ions depending upon the degree of neutrality of the copolymer in the shaped article. If the copolymer prior to use in making the immiscible polymer blend is completely neutralized in that all of the carboxyl groups have been converted to soluble salts, then it may not be necessary to render the water in the water extraction step alkaline. However, in the general case, it is desirable to use alkaline water regardless of the degree of neutrality of the ethyleneacrylic and/or methacrylic acid copolymer. Broadly speaking, one should provide sufficient alkaline ions in the water treating solution such as to render, in any case, complete neutrality of the carboxyl groups in such copolymer.

Of the materials suitable for effecting such neutrality, water which contains alkali metal ions or ammonia, e.g. water saturated with ammonia, are preferred for effecting such neutrality and solubility of the ethylene-acrylic and/or methacrylic acid copolymer.

There are a few points which should be mentioned with respect to the water treatment. When the shaped article is treated with water, there is obtained after initial treatment with water a swollen, gummy mass of ultrafine fibers. Such mass may be grabbed by the fingers or by a tenter frame at the sides thereof and pulled out in the width direction to form a desirable gossamer web sheet. The degree of pulling should be sufficient to provide the desired sheet thickness and such thickness can be drawn down to almost the thickness of the individual ultra-fine fibers in the sheet. The greater the width extension of the ultra-fine fibers containing gummy mass in the water treatment step, the more open will become the structure of the web, that is, the individual ultra-fine fibers will become more separated from each other to give a truly open appearing structure having maximum porosity to water and air.

In the preferred practice of this invention, to facilitate web formation and the uniformity thereof and also to improve the speed of production of a web product, the shaped article is preferably in the form of a tape or sheet. The distinction between a tape or sheet is oftentimes hazy since a tape can be classified as a sheet and vice versa. For purposes of this invention a tape is classified as a flat layer of immiscible polymer fibers having a width of not more than about two inches and a length of at least one foot whereas a sheet has a width of at least two inches and the same length as the tape. In such form, the immiscible polymer fibers can be caused to separate more readily by action of the water treatment.

In addition, as the tape or sheet is extracted with water, a water force can be effected to cause the resulting web to become spread out in the width direction and thereby provide the desired uniform dimensions.

After the water treatment, the web can be treated to effect removal of the water. Most desirably, the web is dried to remove the last substantial traces of water and the resulting gossamer web can be collected in a roll by conventional methods.

With respect to the formation of non-woven fiber sheet having thicknesses in excess of the gossamer web, there are a plurality of methods available in the practice of this invention to produce exceptionally useful products. Generally speaking, such methods effect a criss-cross laydown pattern of such ultrafine fiber bundles as produced by extraction of the shaped article. For example, the gossamer web sheets described above may be crosslapped in the same manner that one employs in crosslapping garnetted or carded sheets of staple fibers. Thus the gossamer web may be supplied to a conventional crosslapper which continuously lays the subsequent layer of the sheet over a preceding layer in the conventional manner so as to effect a criss-cross pattern of such sheets with respect to those superimposed thereon or thereunder. In addition, the wet sheet removed from the water extraction step may be randomly laid down onto a moving belt or screen to produce the criss-cross or a random pattern. Another technique for effecting such criss-cross pattern either randomly or controlled involves the passage of such gossamer web into an air current stream which serves to bulk the web and from the air stream the web is deposited in a random pattern onto a moving belt or screen.

After the crosslapped sheet is formed or during the formation of such crosslapped sheet, a curable resin can be supplied to the sheet or the webs to effect bonding of the fibers therein. Alternatively, the sheet may be provided with two or more water insoluble, fiber-forming polymers therein as fibrils and such sheet may be treated with a solvent which selectively dissolves one of such polymers fibers so as to convert it into a liquid adhesive which permeates the web or sheet and interbonds the fibers throughout the web. The adhesive is dried by evaporating the solvent. In addition, one of the polymer fiber components may have a substantially lower melting point than the residual fiber component and after sheet formation such low melt residual fiber component can be melted by heating the sheet above its melting point but below the melting point of the residual fiber component. Adhesion is effected upon cooling the sheet.

In most cases, it is desirable to use an elastomeric adhesive sprayed on or saturated into the sheet which after drying, interbonds the fibers of the sheet without adding stiffness to the resulting sheet.

Figure 2:
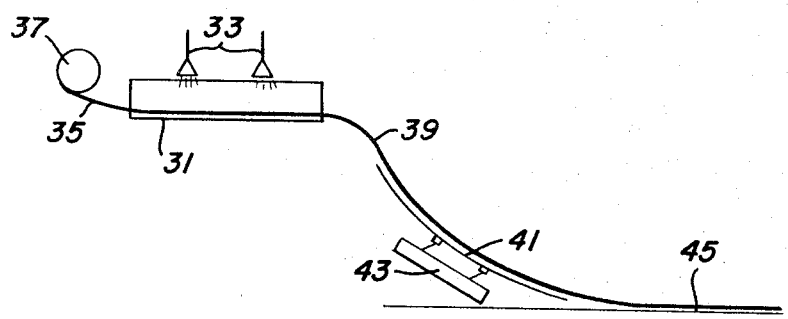

In order to better characterize the methods employable in formation of the aforementioned thin webs, reference is made to FIGS. 1 and 2 which schematically represent methods for making thin sheets of ultra-fine fibers.

With respect to FIG. 1, there is taken from roll 1, sheet 3 comprising a mono-axially oriented tape of immiscible fibers formed by melt extruding, with drawing, a polymer mixture of a water-insoluble, melt-extrudable, fiber forming polymer; a partially saponified copolymer of ethylene and acrylic acid; and the extraction aid, such as glycerine. The tape is passed into trough 5 into which is sprayed from spray nozzles 7 an aqueous caustic solution, such as water containing sufficient sodium to effect at least complete neutralization of the ethylene-acrylic acid copolymer. During the residence time of tape 3 in trough 5, which is usually not more than a minute or two, the tape starts to swell and obtain a gelatinous or gummy appearance indicating that the extraction does not occur immediately on the surface when the water is first brought into contact with the tape, and in all probability the extraction aid with water is absorbed into the interior of the tape before any significant extraction takes place. During that time in trough 5 the swollen tape may be gripped at the edge and gently pulled apart to cause the sheet to increase in width and to effect shifting in the direction of some of the fibers so that the sheet gains a random appearance of fibers, some of which extend in the sheet length direction and others of which lay laterally thereto in the sheet width direction. This feature is unique in so far as it creates a sheet which does not readily split when pulled in the sheet width direction because of the orientation of fibers in such direction. After the desired amount of washing is effected, the sheet is passed onto endless belt or screen 9 which rides about rollers 11 and which is held taut by tension rollers 13 and 15. Under screen 9 are a number of vacuum boxes connected to the vacuum source, not shown, which serve the purpose of aiding in the removal of water contained in the sheet. The wet sheet is guided by roller 17 into drying oven 19 which is heated either externally or internally. The sheet passes over and around rollers 21 therein to provide sufficient time within drying oven 19 to effect essentially complete removal of all water in the sheet and dried sheet 27 is removed therefrom around roller 23 and accumulated on wind-up roller 25. Roller 28 assists in the wind up of sheet 27 about roller 25. The product obtained, that is sheet 27, from the process described in FIG. 1 can have two characteristics: if tape 3 treated in trough 5 is not spread apart while in the gelatinized condition, sheet 27 will comprise ultra-fine fibers therein essentially aligned in the sheet length direction. However, if tape 3, while in trough 5, is spread apart while in the gelatinized condition, the fibers in sheet 27 will possess a random pattern, many fibers aligned in the sheet length and width directions, as well as oblique to both directions. The latter technique provides a sheet with better dimensional stability essentially in all directions yet such sheet has an extremely small thickness as a result of the widening action. Such sheet may have a thickness theoretically as low as 1 micron.

With respect to FIG. 2, there is described a roll 37 containing tape 35 which is withdrawn therefrom. Tape 35 can be of the same composition as tape 3 above. The tape is introduced to trough 31 into which is introduced caustic containing water from spray head 33. Trough 31 can be level, as depicted, or canted in the manner shown in FIG. 1 to improve run off. Drainage therefrom can be provided in any conventional manner. The tape is gelatinized in trough 31 and it may be allowed to pass therethrough without widening. The wet tape 39 removed from trough 31 is passed onto an oscillating surface 41 driven in a direction lateral to the direction of belt or screen 45. This oscillating action of surface 41 causes tape 39 to be laid down upon screen 45 in a cross-lapping and somewhat random pattern such that tape 39 length is not aligned in the direction of movement of screen 45 but is aligned in a criss-crossing pattern such that its length direction becomes lateral to the direction of screen 45. Only a portion of screen 45 is shown in FIG. 2. It is an endless screen equivalent to screen 9 of FIG. 1 and moves the criss-cross web deposited thereon by surface 41 into a drying oven and may be recovered on rollers such as described in FIG. 1. In the preferred practice of the process described in FIG. 2 there is preferably provided an adhesive spraying nozzle over screen 45 whereby to deposit a small amount of adhesive sufficient to effect bonding of the fibers in the crosslapped sheet. Most desirably, there is employed a rubber latex adhesive which cures to a completely solid state when heated. In addition or substitution, there may be added a trough containing liquid adhesive subsequent to screen 45 into which the crosslapped sheet is passed followed by nip rollers to squeeze off any excess adhesive deposited in the crosslapped sheet.

Though this invention has been described with respect to a plurality of details, it is not intended that the invention be limited thereby. The following examples are offered solely to illustrate useful embodiments of this invention and to characterize modes thereof.

EXAMPLE I

A mixture of .405 grams of pellets of a 60 percent neutralized sodium salt of an ethylene-acrylic acid copolymer containing 20 percent by weight of polymerized acrylic acid therein and a melt index of 250 is mixed in a vessel with 45 grams of glycerine and held at 58° C. for 24 hours until the glycerine is absorbed into the copolymer salt. The 60 percent sodium salt means that 60 percent of the copolymer's carboxyl groups form sodium salt and are not free carboxyl groups. This mixture is further mixed in a 1¼ inches single screw extruder heated to 177° C. with 550 grams of film and fiber grade polypropylene having a melt index of 2–4 and a density of 0.88. The mixture is extruded and pelletized. The pellets are then extruded through a tubular die to prepare a tube which is flattened and then unidirectionally stretched 800 percent to impart uni-axial molecular orientation. The flattened tube is cut to a 1 inch width.

A 4 inch long piece of the 1 inch wide tape is boiled in distilled water containing a molar amount of sodium hydroxide to provide at least an equivalent amount of sodium for the amount of carboxyl groups present in the copolymer. The tape swells into a loose gelatinous fibrous network and after ten minutes of boiling the treated tape is transferred to a tray containing distilled water and a small quantity of sodium hydroxide. The tape is now carefully grabbed by its two long sides at the ends defining its 4 inches dimension and pulled apart. The fine polypropylene fibers of the tape are essentially perpendicular to this direction of pull. The tape can be lengthened from its one inch width dimension upwards to 24 inches wide by pulling at the ends defining its 1 inch width. When this is done, the parallel fibers are extended and lose their parallelism and turn into the direction of pull. After drawing the tape sideways a loose non-woven fibrous web exists comprised of one micron and smaller fibers of great length, randomly distributed.

This web is then picked up on a flat surface by skimming it out of the water. The web has a thickness of 5 microns uniformly across its dimensions.

EXAMPLE II

Two and one half pounds of high density polyethylene, 2½ pounds of the ethylene-acrylic acid copolymer salt of Example I and 0.4 pounds of glycerine are mixed in a Banbury mixer and then ground to pellet size in a grinder.

The ground compound is extruded into a mono-filament at 180° C. in a 1¼ inch single screw extruder. The monofilament is then stretch oriented 800 percent at 98° C. This mono-filament is rapidly attacked in boiling sodium hydroxide containing water having a pH of 10 and in a short time the product in the water is a loose tow of ultra-fine fibers by extraction of the copolymer salt and glycerine.

EXAMPLE III

The materials described in Example I, when extruded into a mono-filament as described in Example II, provide the same type of fiber tow described above for Example II.

EXAMPLE IV

A mixture is formed of 360 grams of the 60 percent sodium salt of ethylene-acrylic acid copolymer described in Example I and 40 grams of glycerine. The mixture is placed in a vacuum oven at 58° C. for 24 hours until the glycerine is absorbed into the copolymer. Then the treated copolymer is mixed with 600 grams of the polypropylene described in Example I and the mixture is compounded through an extruder at 204° C. and pelletized. The pellets are then extruded through a 6 inch diameter tubular die into a tubular sheet at 193° C. and the tubular sheet is then unidirectionally stretch oriented 900 percent at 120° C.

This sheet after being slit and opened up is deposited in boiling, sodium hydroxide containing water having a pH of 10, is rapidly attacked to effect complete removal of the salt of ethylene-acrylic acid copolymer leaving a residual fibrous tow of continuous polypropylene fibers.

The ethylene-acrylic acid copolymer of Example I free of sodium (500 grams) and 30.5 grams of sodium hydroxide in 300 milliliters of water are mixed on a 2 roll mill at 160° C. to thereby convert 55 percent of the available carboxyl groups into sodium salt. To the mass on the 2 roll mill are added 40 grams of glycerine and 500 grams of high density polyethylene. The mix effected on the roll is sheeted thereoff, cooled and then ground into extrudable pellets. The pellets are extruded into mono-filaments at 230° C. in a 1¼ inch single screw extruded. The mono-filament is stretch oriented 800 percent at 70° C. and when it is placed in boiling water containing sodium hydroxide and having a pH of 10, a tow of ultra-fine fibers is obtained.

EXAMPLE V

Two pieces of the web produced in Example I containing the fibers essentially parallel therein, each sheet having a thickness of 5 microns, are superimposed over each other such that the direction of the parallel fibers in each sheet are an angle of 45° to the direction of the fibers in the other sheet. The superimposed sheets are thereafter placed between two half-tone printing plates and the total assembly is put between two heated platens of a platen press. The platens are heated to 150° C. Pressure is applied by the platens to the plates sufficient to effect permanent embossment of the sheets and interbonding thereof. The opaque bonded sheet removed from between the plates represents crosslapped sheets interbonded to each other possessing the embossed pattern provided for by the plates. The sheet has excellent strength in all directions when pulled by hand. When the above experiment is repeated except that an extremely thin layer of a butadiene-styrene latex adhesive is first deposited on the surface of one of the sheets, and the sheet is dried to remove essentially all the latex water, and then the other sheet is crosslapped thereon followed by heating between the aforementioned plates under pressure, there is obtained a very strong opaque fabric-like product having the general appareance of a good quality woven fabric.

There is described in U.S. Patents Nos. 3,233,728; 3,342,754; and 3,300,332, methods for making paraxylylene homopolymers and copolymers as well as methods for coating objects with such polymers.

One can by the processes of these patents provide on the aforementioned web surfaces an extremely thin film of such polymers. In a preferred embodiment of this invention such polymers are coated onto the surface of the webs made in accordance with this invention for the purpose of providing a thin protective coating therefor. Such coated webs find excellent utility in the manufacture of artifical body units as described above.

A preferred method for coating the webs of this invention with such polymers is described in U.S. Pat. 3,379,803 wherein a gaseous vapor of para-xylylene is deposited onto a web as it is passed through a vapor sealed gaseous deposition zone. The disclosure of this patent is incorporated herein by reference.

We claim:

1. In the method of making a shaped article from an immiscible polymer blend by melt extrusion of such blend, the improvement which comprises providing as one of the polymers in said blend about 30 to about 60 weight percent of a copolymer of ethylene and at least one of acrylic and methacrylic acids, which copolymer contains at least 14 weight percent of such acid, and an extraction aid which is an organic compound having a hygroscopicity at least as great as that of said copolymer, is melt immiscible with such polymer other than said copolymer and non-reactive therewith, has a boiling point greater than the temperature obtained on said melt extrusion and is present up to about 20 wt. percent of the blend, and the remaining polymer in said blend is non-extractable by water.

2. The method of claim 1 wherein said shaped article is treated with alkaline water to produce ultra-fine fibers of said other fiber.

3. The process of claim 1 wherein the extraction aid is a polyol and said remaining polymer is not a polyester.

4. The process of claim 3 wherein the extraction aid is glycerine.

5. The process of claim 2 wherein the shaped article is in the form of a tape or sheet and treatment thereof with alkaline water produces a non-woven fibrous web.

6. The process of claim 5 wherein the non-woven fibrous web is crosslapped with another non-woven fibrous web to produce a non-woven fabric 7. The process of claim 5 wherein an adhesive is supplied to interbond the fibers of the non-woven web.

References Cited

UNITED STATES PATENTS

| | | | |
|---|---|---|---|
| 2,953,541 | 9/1960 | Pecha et al. | 260—33.4 PO |
| 3,145,187 | 8/1964 | Hankey et al | 260—33.4 PO |
| 3,222,299 | 12/1965 | MacDowell | 260—2.3 |
| 3,323,978 | 6/1967 | Rasmussen | 161—169 |
| 3,361,702 | 1/1968 | Wartman et al. | 260—33.4 PO |
| 3,382,305 | 5/1968 | Breen | 264—171 |
| 3,455,863 | 7/1969 | Williams | 260—33.4 PO |
| 3,536,796 | 10/1970 | Rock | 264—49 |
| 3,644,230 | 2/1972 | Cronin | 260—33.4 PO |

JAY H. WOO, Primary Examiner

U.S. Cl. X.R.

161—170; 260—33.4 PQ, R, 757 L, 859 R, 873, 897 A, R; 264—49